M. G. FARMER.
Electric Battery.
No. 109,603. Patented Nov. 29, 1870.
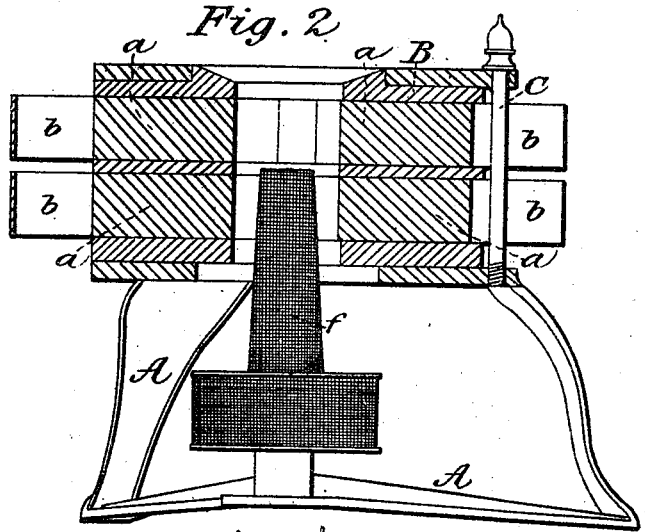
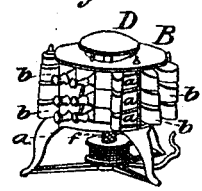
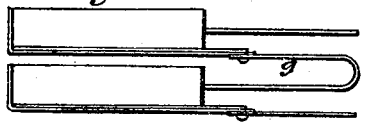
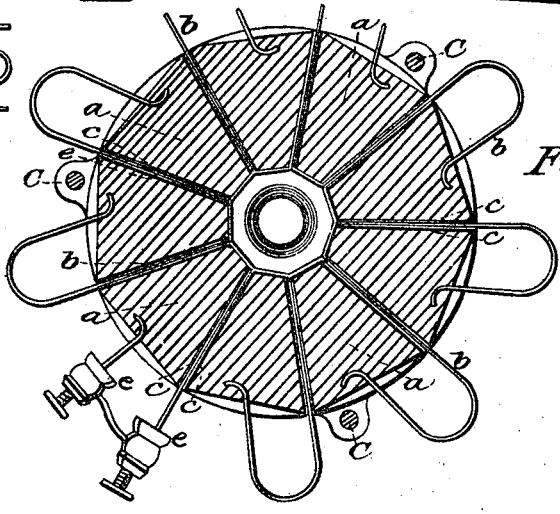
Witnesses: Inventor:

UNITED STATES PATENT OFFICE.

MOSES G. FARMER, OF SALEM, MASSACHUSETTS.

IMPROVEMENT IN THERMO-ELECTRIC BATTERIES.

Specification forming part of Letters Patent No. 109,603, dated November 29, 1870.

*To all whom it may concern:*

Be it known that I, MOSES G. FARMER, of Salem, in the county of Essex and State of Massachusetts, have invented an Improved Thermo-Electric Battery; and I do hereby declare that the following, taken in connection with the drawings which accompany and form part of this specification, is a description of my invention sufficient to enable those skilled in the art to practice it.

The objects of my improvements are to put the thermo-electric battery into a form which shall be better adapted for general practical use, and shall produce electricity more economically than the forms heretofore used.

My improved battery constructed in the manner which I prefer is cylindrical in form, and is composed of a number of thermo-electric pairs united into one or more rings or circles, which surround the source of heat.

Figure 1 of the drawings represents one of my improved batteries of three rings. Fig. 2 is a vertical section of a battery, showing two rings. Fig. 3 is a sectional plan of one ring.

A represents the base or support of the battery.

B is a plate with a hole in the middle, which serves, in connection with the rods C C, to hold the rings in place.

D is a cup or cover placed over the central orifice to check the draft of air caused by the burner.

Each ring is composed of a series of pairs, connected together as shown in Fig. 3. These pairs are constructed substantially in the manner described in another application by me for a patent for improvement in thermo-electric pairs, except that the antimony-zinc bars (represented by *a a*, &c.) are wedge-shaped in order that a series of pairs may be arranged in a circle.

*b b* represent the German-silver bars.

*c c*, &c., represent the pieces of mica which are placed between the bars to insulate them.

*e e* represent the screw-cups to receive the conductor which is to connect the opposite poles of a series of pairs. The heat is received on the inner ends of the bars from a gas-burner. (Represented by *f*.)

Several important advantages are gained by arranging the bars around the source of heat. The heat is intercepted on all sides by the pairs, and is thus better economized. The outer ends of the bars are also favorably placed for cooling, as the heat is radiated from them in all directions. The bars, when arranged in a circle, are also all placed in the same relation to the source of heat, and are thus likely to be equally heated. The bars may be arranged around the source of heat in other forms than the circle and secure these advantages more or less effectually; but I consider the circular form the best for general purposes.

It will be observed that the German-silver element of the pairs is much longer than the antimony-zinc bars, and is bent around to connect with the antimony-zinc bar of the adjacent pair so as to form a loop.

An important advantage is gained by this mode of construction, as it increases the cooling-surface, and this tends to maintain a greater difference in temperature between the opposite ends of the bars. This increases the electro-motive force of the battery.

Instead of making the German-silver element long enough to connect directly with the next bar, I sometimes make it about the length of the antimony-zinc bar and attach to it a strip of copper which is connected with the next bar. Copper being a cheaper metal than German silver and a better conductor of heat and electricity, this mode of construction possesses some advantages in many cases. Bars connected in this way are represented in Fig. 4, *g* being the interposed copper strip.

The number of rings may be one or more, according to the power required. They may be increased indefinitely as long as they can be heated equally, or nearly so.

It will be readily understood that the pairs may be united in a variety of ways to vary the intensity or quantity of electricity like any other form of battery. The bars must be completely insulated from the metal frame or support of the battery.

In constructing a battery I embed the bars in a non-conducting cement which will resist heat, like plaster-of-paris. A layer is placed between the lower ring and the base on which the battery rests, and also between the rings and between the upper ring and the plate B, by means of which the rings are bound together. By embedding the rings in cement in this manner two advantages are secured. The bars formed of the antimony-zinc alloy are very brittle and liable to break under a small strain or jar. By means of the cement the bars are so securely held that the liability to break is greatly reduced. The cement also prevents currents of air from passing either in or out between the bars. Such currents interfere sensibly with the working of the battery.

The source of the heat in the battery represented in the drawings is a gas-burner of peculiar construction, for which I intend to apply for a patent; but burners of other forms may be successfully used—such as those known as "Bunsen's" and "Shaw's." "Vapor-burners," so called, may also be used. The burner known as "Morrill's" is an example. Spirit, fluid, and oil lamps can also be employed.

If the battery is of considerable size, a wood or coal stove or furnace may be employed. It is important that the heat shall be as uniform and as equally distributed over all the bars as possible.

The products of combustion may be allowed to impinge directly upon the ends of the pairs; or a metallic cylinder may be placed within the ring and at a short distance from it, within which the heat is generated or conducted and from which the heat is radiated upon the bars.

When a large battery is required it may be constructed around some of the well-known cylindrical stoves, like those known as "Stewart's air-tight stoves."

When the products of combustion are allowed to come into direct contact with the bars the bars are more effectually heated; but, on the other hand, they are more liable to injury and deterioration.

What I claim as my invention is—

1. A thermo-electric battery constructed so as to surround or inclose the source of heat, substantially as described.

2. A thermo-electric battery with the pairs arranged in curved tiers one above another, and compacted by cement, substantially as described.

MOSES G. FARMER.

Witnesses:
J. B. CROSBY,
S. B. KIDDER.